United States Patent
Cammas et al.

(10) Patent No.: US 12,361,107 B2
(45) Date of Patent: Jul. 15, 2025

(54) METHOD FOR MANAGING A BIOMETRIC SMART CARD

(71) Applicant: THALES DIS FRANCE SAS, Meudon (FR)

(72) Inventors: Guillaume Cammas, Aubagne (FR); Jean-Luc Salles, La Bouilladisse (FR); Pierre Souchon, La Ciotat (FR); Nicolas Boulanger, Meyreuil (FR)

(73) Assignee: THALES DIS FRANCE SAS, Meudon (FR)

( * ) Notice: Subject to any disclaimer, the term of this patent is extended or adjusted under 35 U.S.C. 154(b) by 156 days.

(21) Appl. No.: 17/918,124

(22) PCT Filed: Apr. 14, 2021

(86) PCT No.: PCT/EP2021/059700
§ 371 (c)(1),
(2) Date: Oct. 11, 2022

(87) PCT Pub. No.: WO2021/219382
PCT Pub. Date: Nov. 4, 2021

(65) Prior Publication Data
US 2023/0137390 A1    May 4, 2023

(30) Foreign Application Priority Data
Apr. 28, 2020 (EP) .................................... 20315226

(51) Int. Cl.
*G06F 21/32* (2013.01)
*G06F 21/88* (2013.01)
(Continued)

(52) U.S. Cl.
CPC ............ *G06F 21/32* (2013.01); *G06F 21/88* (2013.01); *G06K 19/0718* (2013.01); *G06K 19/07705* (2013.01); *G06F 2221/2143* (2013.01)

(58) Field of Classification Search
CPC .. G06F 21/32; G06F 21/88; G06F 2221/2143; G06K 19/0718;
(Continued)

(56) References Cited

U.S. PATENT DOCUMENTS

| 5,481,609 A | * | 1/1996 | Cohen | G06Q 20/341 |
| | | | | 235/382 |
| 11,734,979 B2 | * | 8/2023 | Cox | G06K 19/06196 |
| | | | | 340/5.65 |

(Continued)

FOREIGN PATENT DOCUMENTS

| EP | 2290625 A1 | 3/2011 |
| WO | 2019149364 A1 | 8/2019 |

OTHER PUBLICATIONS

International Search Report (PCT/ISA/210) and Written Opinion (PCT/ISA/237) mailed on Jun. 9, 2021, by the European Patent Office as the International Searching Authority for current International Application No. PCT/EP2021/059700- [16 pages].

(Continued)

*Primary Examiner* — Khoi V Le

(57) ABSTRACT

Provided is a method for managing a biometric sensor configured to collect a captured biometric data and a secure element able to communicate with the biometric sensor through a communication channel. The method comprises receiving a specific data by the biometric smart card, and checking the specific data by using a control data pre-stored in the biometric smart card. Only if said checking is successful, it then executes an erasing command for removing (Continued)

said reference biometric data from the biometric smart card and a disabling command for permanently deactivating the communication channel.

7 Claims, 4 Drawing Sheets

(51) Int. Cl.
    *G06K 19/07*     (2006.01)
    *G06K 19/077*     (2006.01)

(58) Field of Classification Search
    CPC ......... G06K 19/07705; G06Q 20/3825; G06Q 20/4012; G06Q 20/40145; G06Q 20/40975; G06Q 20/3415; G07F 7/1066
    See application file for complete search history.

(56) References Cited

U.S. PATENT DOCUMENTS

| | | | | |
|---|---|---|---|---|
| 11,836,232 | B1* | 12/2023 | Durairaj | G06V 40/172 |
| 2002/0090117 | A1* | 7/2002 | Kramer | G06V 10/10 |
| | | | | 382/124 |
| 2007/0075140 | A1* | 4/2007 | Guez | G06K 19/0723 |
| | | | | 235/435 |
| 2009/0191846 | A1* | 7/2009 | Shi | H04L 63/0861 |
| | | | | 455/411 |
| 2012/0246442 | A1* | 9/2012 | Dolgunov | G06F 21/57 |
| | | | | 711/E12.078 |
| 2015/0100485 | A1* | 4/2015 | Skliar | G06Q 20/40145 |
| | | | | 705/41 |
| 2017/0004475 | A1* | 1/2017 | White | G06Q 20/322 |
| 2018/0276518 | A1* | 9/2018 | Benkley, III | G06Q 20/40145 |
| 2018/0373857 | A1* | 12/2018 | Larsen | G06F 21/32 |
| 2019/0037078 | A1 | 1/2019 | Kim et al. | |
| 2019/0251236 | A1* | 8/2019 | Lowe | G06V 40/1365 |
| 2020/0053084 | A1* | 2/2020 | Vajravel | H04L 67/131 |

OTHER PUBLICATIONS

EMVCO: 11EMV Issuer and Application Security Guidelines11, EMV, EMVCO—vol. 2,6 ; Contactless —Aug. 29, 2018 (Aug. 29, 2018), pp. 1-78, XP061034053, Retrieved from the Internet: URL:https://www.emvco.com/wp-content/uploa ds/documents/EMV-SWG-NH20r2a-Issuer-Securi ty-Guidelines-for-Ist-Gen-August2018.pdf [retrieved on Oct. 5, 2018]—sections 5.4, 5.5.

EMVCo, LLC; A Guide to EMV Chip Technology~ Version 3.0 ; Nov. 2017; XP61034007A.

* cited by examiner

METHOD FOR MANAGING A BIOMETRIC SMART CARD

FIELD OF THE INVENTION

The present invention relates to methods for managing a biometric smart card. It relates particularly to methods of managing biometric features of a smart card which embeds at least one biometric sensor.

BACKGROUND OF THE INVENTION

Smart cards are portable small devices comprising a memory, a microprocessor and an operating system for computing treatments. They may comprise services applications like payment applications. Such secure elements may comprise a plurality of memories of different types, like non-volatile memory and volatile memory. They are considered as tamper-resistant (or "secure") because they are able to control the access to the data they contain and to authorize or not the use of data by other machines. A smartcard may also provide computation services based on cryptographic components. In general, smartcards have limited computing resources and limited memory resources and they are intended to connect a host machine which provides them with electric power either in contact mode or contactless mode.

A smart card may contain a biometric sensor like a fingerprint sensor which can contribute to the authentication of the user of the smartcard. A biometric smart card may embed a biometric reference data corresponding to the user of the smart card. Such a biometric reference data is recorded during an enrollment phase. The biometric smartcard embeds a biometric algorithm designed to compare a data captured by the biometric sensor with the biometric reference data in order to authenticate the cardholder.

When a biometric smart card is stolen, lost or has a validity date which has expired, the genuine user of the biometric smart card may want that biometric features of the smart card are no more reachable for security and privacy reasons.

There is need to enhance the management of biometric features of a smart card.

SUMMARY OF THE INVENTION

The invention aims at solving the above mentioned technical problem.

An object of the present invention is a method for managing a biometric smart card associated to a user. The biometric smart card comprises a reference biometric data which has been previously enrolled by the user, a biometric sensor which is configured to collect a captured biometric data from a person and a secure element able to communicate with the biometric sensor through a communication channel. The method comprises the steps of:
- receiving, by the biometric smart card, a specific data;
- checking, by the biometric smart card, the specific data by using a control data pre-stored in the biometric smart card; and
- only if said checking is successful, executing by the biometric smart card both an erasing command for removing said reference biometric data from the biometric smart card and a disabling command for permanently deactivating said communication channel.

Advantageously, the biometric smart card may receive the specific data from a hardware machine which is coupled to the biometric smart card, the specific data may be a cryptographic data and the control data may be a key.

Advantageously, the biometric smart card may receive the erasing command, the disabling command and the specific data from a hardware machine coupled to the biometric smart card and the specific data may be a PIN code entered by said user.

Advantageously, the biometric smart card may receive said erasing command and disabling command from a hardware machine coupled to the biometric smart card, the biometric smart card may receive said specific data directly from the user, the specific data may be a biometric data and the control data may be the reference biometric data.

Advantageously, the biometric smart card may receive said specific data from a hardware machine coupled to the biometric smart card, said specific data may be a current date, said control data may be a validity date pre-stored in the biometric smart card and said erasing command and disabling command may be pre-stored in the biometric smart card.

Advantageously, the biometric smart card may get power from a hardware machine coupled to the biometric smart card, the biometric smart card may receive said specific data directly from the user, the specific data may be a biometric data, the control data may be said reference biometric data and said erasing command and disabling command may be pre-stored in the biometric smart card.

Advantageously, the biometric smart card may be configured to work at least in an enrolment mode and in a erasing mode, the activation of the erasing mode may be triggered by a predefined sequence of actions of the user and the biometric smart card may comprise a LED which may be gradually turned on to guide the user when performing the predefined sequence of actions.

Advantageously, the disabling command may permanently deactivate said communication channel by updating a digital value or by physically destroying a hardware component into the biometric smart card.

Another object of the present invention is a biometric smart card allocated to a user and comprising a reference biometric data previously enrolled by said user, a biometric sensor configured to collect a captured biometric data from a person and a secure element able to communicate with the biometric sensor through a communication channel. The biometric smart card comprises at least a processing unit and instructions which cause said biometric smart card to:
- receive a specific data,
- check the specific data by using a control data pre-stored in the biometric smart card, and
- only if said checking is successful, execute both an erasing command for removing said reference biometric data from the biometric smart card and a disabling command for permanently deactivating said communication channel.

Advantageously, the biometric smart card may be configured to receive said erasing command, said disabling command and said specific data from a hardware machine coupled to the biometric smart card and the specific data may be a PIN code entered by said user.

Advantageously, the biometric smart card may be configured to receive said erasing command and disabling command from a hardware machine coupled to the biometric smart card, the biometric smart card may be configured to receive said specific data directly from the user, the specific data may be a biometric data and the control data may be the reference biometric data.

Advantageously, the biometric smart card may be configured to receive said specific data from a hardware machine coupled to the biometric smart card, said specific data may be a current date, the control data may be a validity date which has been pre-stored in the biometric smart card and said erasing command and disabling command may be pre-stored in the biometric smart card.

Advantageously, the biometric smart card may get power from a hardware machine coupled to the biometric smart card, the biometric smart card may be configured to receive said specific data directly from the user, the specific data may be a biometric data, the control data may be said reference biometric data and said erasing command and disabling command may be pre-stored in the biometric smart card.

Advantageously, the biometric smart card may be configured to work at least in an enrolment mode and in a erasing mode, the activation of the erasing mode may be triggered by a predefined sequence of actions of the user, the biometric smart card may comprise a LED and the biometric smart card may gradually turn on said LED to guide the user when performing the predefined sequence of actions.

Advantageously, the disabling command may permanently deactivate said communication channel by updating a digital value or by physically destroying a hardware component into the biometric smart card.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of biometric smart card associated to a user and intended to provide a service. The biometric smart card may be a bank smart card or an identity badge for instance.

Figure 1:
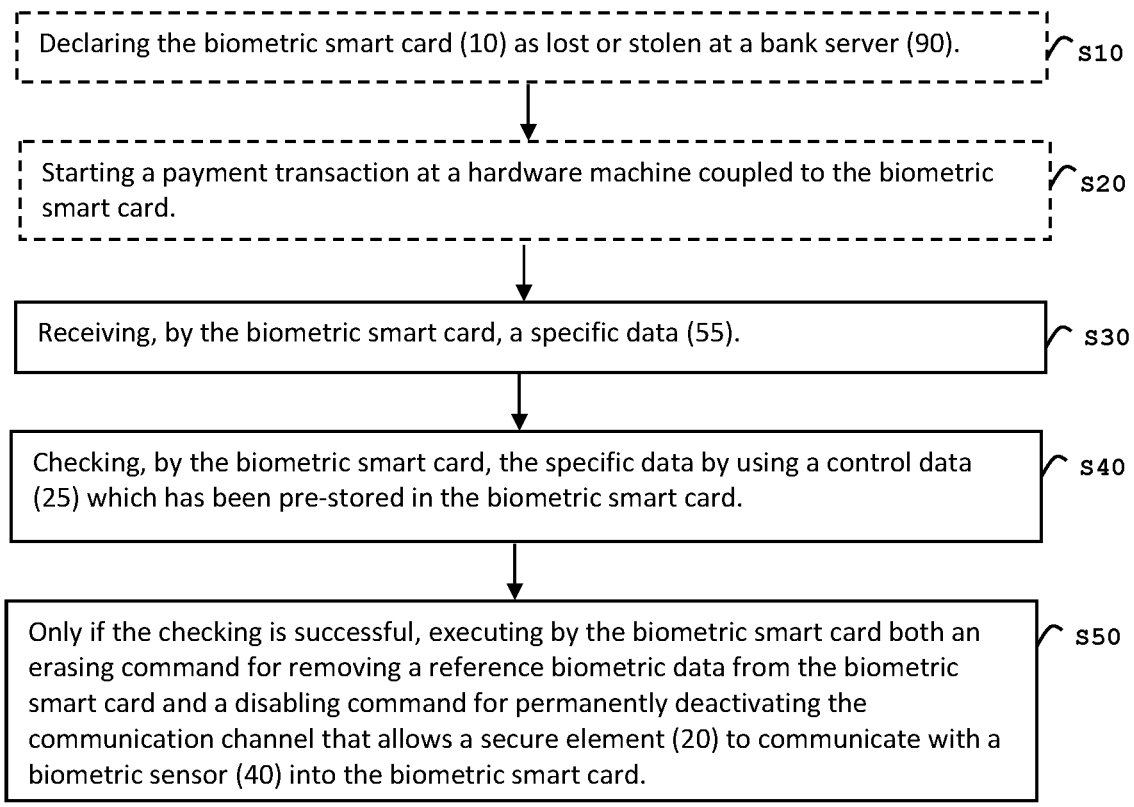
FIG. 1 shows a first exemplary flow diagram for managing biometric features of a smart card according to an example of the invention.

FIG. 1 shows a first exemplary flow diagram for managing biometric features of a smart card according to an example of the invention.

In this example, the biometric smart card is a banking card intended to be used by its associated user (i.e. bank customer) for payment or cash withdrawal.

The bank smart card 10 embeds a biometric sensor 40 designed to capture fingerprint data. The bank smart card embeds a secure element 20 comprising a hardware processing unit, memory and an operating system designed to contribute to bank services. The secure element is configured to establish a communication channel with the biometric sensor in order to get access to data captured by the sensor. The communication channel may be established either directly between the secure element and the sensor or through a controller of the sensor. The bank smart card comprises a reference biometric data which has been enrolled by the user (i.e. bank customer).

At an optional first step S10, the user (e.g. bank customer) may declare to her/his bank that the biometric smart card 10 has been lost or stolen. This information is provided to a server computer 90 of the bank.

At an optional second step S20, a person who found the smart card 10 is supposed to start an online transaction at a hardware machine coupled to the biometric smart card. For instance, the transaction may be a payment to be carried out between the smart card and a distant server through a terminal located at a point of sales.

At step S30, the smart card receives a specific data 55. In this example, the specific data may be provided to the smart card by the distant server 90 through the local terminal.

At step S40, the biometric smart card checks the specific data 55 by using a control data 25 which has been pre-stored in the biometric smart card. For example, the control data 25 may be a key which has been stored in the smart card before its issuance (E.g. at manufacturing stage) and the specific data may be a signature whose authenticity can be checked using the key 25.

Only if the checking of step S40 is successful, at step S50, the biometric smart card executes both an erasing command for permanently removing the reference biometric data from the biometric smart card and a disabling command for permanently deactivating the communication channel that allows the secure element 20 to communicate with the biometric sensor 40 into the biometric smart card. It is important to note that the deactivation of the communication channel (and the ability to establish the communication channel) is not temporary, but definitive.

In one variant, the disabling command may permanently deactivate the communication channel (between the secure element and the biometric sensor) by updating a digital value. For instance, the disabling command may permanently erase or disable a key in the secure element. For instance, the disabling command may permanently block the GPIO (General Purpose Input/Output) of the secure element which are used to communicate with the biometric sensor.

In one variant, the disabling command may permanently deactivate the communication channel by physically destroying a hardware component into the biometric smart card. For instance, the disabling command may blow a fuse required to physically access the sensor.

It is to be noted that the erasing command and disabling command may be received by the smart card with the specific data 55 via a script for instance or the smart card may receive a triggering data that triggers the execution of the erasing command and disabling command which may be pre-stored in the smart card.

In on embodiment, steps S10 and S20 may be replaced by a step in which the cardholder (I.e. the genuine user of the smart card) requests the bank to deactivate the biometric feature of the smart card. Such a request may be performed through the user interface of an ATM (Automated Teller Machine) for example. It is to be noted that such a request may be performed before the smart card validity expires.

In on embodiment, steps S10 and S20 may be replaced by a step in which the cardholder inserts the smart card into a hardware machine (like a portable card reader) which is not connected to the bank server and requests deactivation of the biometric features of the smart card through the user interface of the hardware machine.

In on embodiment, steps S10 and S20 may be replaced by a step in which the cardholder inserts the smart card into a hardware machine (like a portable card reader) which is not connected to the bank server and requests deactivation of the biometric features of the smart card by following a specific sequence using the biometric sensor of the smart card.

In on embodiment, steps S10 is not executed. The sequence may start at step S20 and the smart card may receive the current date as specific data 55 and automatically compare the received date to its own pre-stored validity date (as control data) at step S40.

Figure 2:
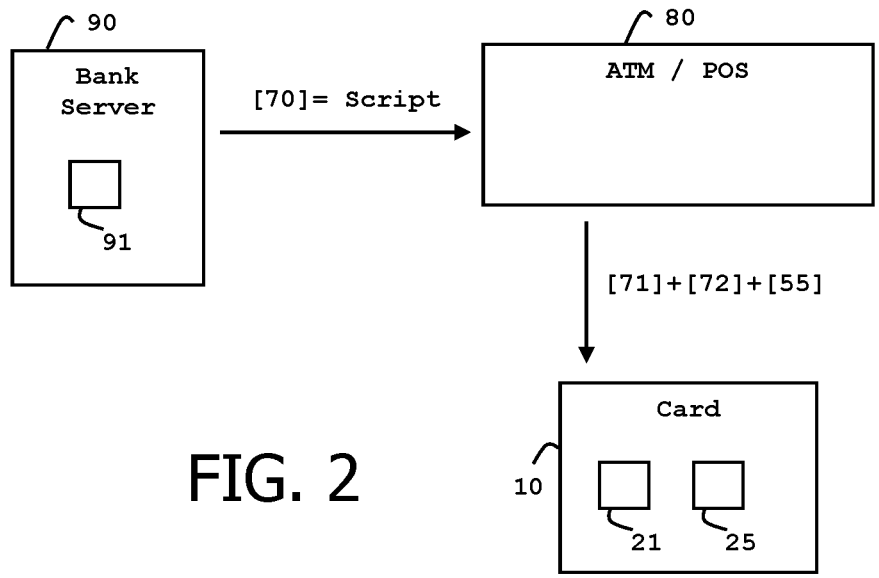
FIGS. 2-6 show several exemplary embodiments of a smart card coupled to a hardware machine according to a plurality of embodiments of invention.

FIG. 2 shows a first exemplary embodiment of the smart card coupled to a hardware machine according to an example of invention.

In the example of FIG. 2, a bank server 90 comprises a first script processing key 91 and is able to use the key 91 to generate scripts whose integrity and authenticity can be checked by the smartcard 10. A hardware machine 80 is connected to the bank server 90 using conventional networks and protocols. The hardware machine may be an ATM or Point of Sale (POS) terminal. The biometric smart card 10 comprises a reference biometric data 21 (previously stored during enrolment of the cardholder) and a second script processing key 25 which is paired with the first script processing key 91. The biometric smart card 10 also comprises a secure element and a biometric sensor (not shown).

Assuming that the bank server 90 knows that the genuine user (e.g. bank customer) declared that the biometric smart card 10 has been lost or stolen, a person who got the smartcard 10 may try to unduly use the smartcard. This person may start an online transaction with the hardware machine 80. The bank server 90 may generate a script 70 comprising an erasing command 71, a disabling command 72 and a cryptographic data 55 computed by using the first script processing key 91. Preferably, the cryptographic data may be a MAC (message authentication code).

Then the script 70 may be forwarded to the smart card 10 through the hardware machine 80. In other words, the smart card may receive from the hardware machine 80 a specific data 55 which is a cryptographic data.

Then the biometric smart card may check the MAC 55 (i.e. the specific data) by using the second script processing key 25 (as control data).

Only if the MAC has been successfully checked (i.e. the script 70 has been authenticated), the biometric smart card may make the decision to execute both the erasing command 71 for removing the reference biometric data 21 from the biometric smart card and the disabling command 72 for permanently deactivating the communication channel that allows the secure element to communicate with the biometric sensor into the biometric smart card.

It is to be noted that the receipt of the script 70 by the card may occur even if the cardholder has not been authenticated by the smart card. Naturally, the online transaction initially requested is not completed.

The script 70 may be handled by using the convention script processing mechanism as defined by EMV© specifications.

In another embodiment, the genuine user (e.g. bank customer) may have requested to the bank the deactivation of the biometric features before the end of life of the smart card. The genuine user may start an online transaction with the smart card in order to initiate the sending of a script similar to the one described above. In such a case, the cardholder may be authenticated (through a PIN or a fingerprint for instance) or not, depending on a preset bank policy and/or the desire to correctly complete the online transaction.

Figure 3:
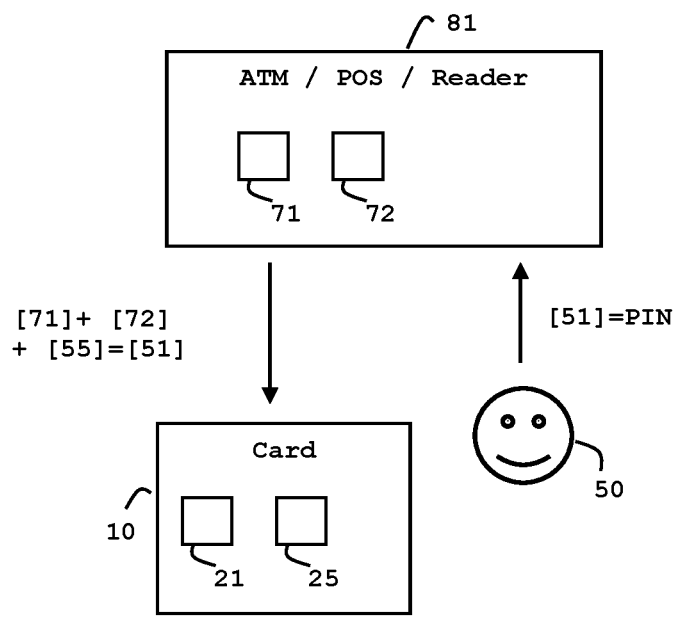

FIG. 3 shows a second exemplary embodiment of the smart card coupled to a hardware machine according to an example of invention.

In the example of FIG. 3, a biometric smart card 10 is inserted in a hardware machine 81 like an ATM, a POS terminal or a portable card reader. The biometric smart card 10 comprises a secure element, a biometric sensor, a reference biometric data 21 and a control data 25 which is intended to control the authenticity of a PIN code value associated to the genuine user 50. The hardware machine 81 stores the erasing command 71 and the disabling command 72. The hardware machine 81 includes a user interface which may comprise a display and a keyboard.

The genuine user 50 may insert the smart card 10 into the hardware machine 81, enter her/his PIN code 51 and request deactivation of the biometric features of the smart card 10 through the user interface of the hardware machine 81.

The hardware machine 81 may send the entered PIN code 51 to the smart card 10. The hardware machine 80 may send the erasing command 71 and the disabling command 72 to the smart card 10. In other words, the biometric smart card receives the erasing command, the disabling command and the specific data from the hardware machine 81 coupled to the biometric smart card and the specific data is a PIN code 51 entered by the user 50.

The biometric smart card may check the received PIN code 51 (which is the specific data) by using the previously stored control data 25.

Only if the received PIN code 51 has been successfully checked (i.e. the PIN code 51 entered by the cardholder is valid), the biometric smart card 10 may execute both the erasing command 71 for removing the reference biometric data 21 from the biometric smart card and the disabling command 72 for permanently deactivating the communication channel that allows the secure element to communicate with the biometric sensor into the biometric smart card.

Preferably, the user may be informed of the successful completion of the deactivation operation by a message displayed via the user interface of the hardware machine 81.

Figure 4:
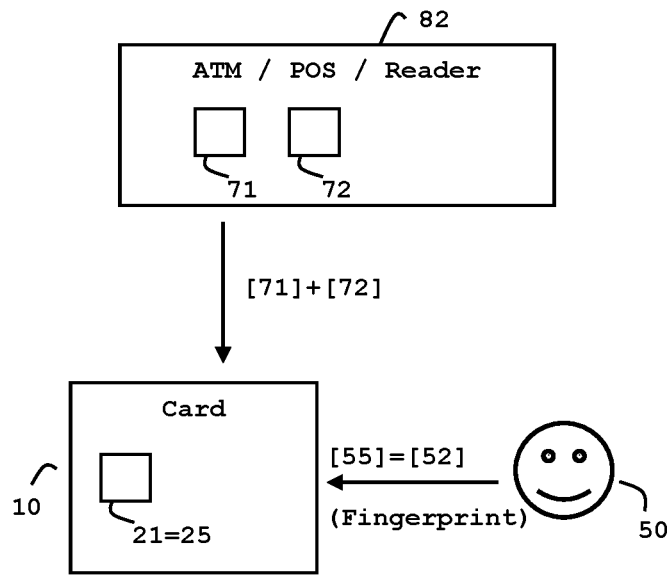

FIG. 4 shows a third exemplary embodiment of the smart card coupled to a hardware machine according to an example of invention.

In the example of FIG. 4, a biometric smart card 10 is inserted in a hardware machine 82 like an ATM, a POS terminal or a portable card reader. The biometric smart card 10 comprises a secure element, a biometric sensor, a reference biometric data 21. The control data 25 is the reference biometric data 21. The hardware machine 82 comprises the erasing command 71 and the disabling command 72. The hardware machine 82 includes a user interface which may comprise a display and a keyboard.

The genuine user 50 may insert the smart card 10 into the hardware machine 82, present her/his finger to the sensor so that the smart card gets the fingerprint 52 of the user 50 and request deactivation of the biometric features of the smart card 10 through the user interface of the hardware machine 82.

The hardware machine 82 may send the erasing command 71 and the disabling command 72 to the smartcard 10. In other words, the biometric smartcard may receive the erasing command and the disabling command from the hardware machine 82 coupled to the biometric smart card and may receive the specific data (biometric data in this example) directly from the user 50.

The biometric smart card may check the captured fingerprint 52 (which is the specific data) by using the previously stored reference biometric data 21 (which is the control data 25 in this example). It is to be noted that the captured biometric data 52 may be treated before the comparison with the reference biometric data 21. For instance an anti-spoofing algorithm may be applied to the captured data 52.

Only if the captured biometric data 52 has been successfully checked (i.e. the fingerprint of the cardholder has been successfully recognized), the biometric smart card 10 may execute both the erasing command 71 for removing the reference biometric data 21 from the biometric smart card and the disabling command 72 for permanently deactivating the communication channel that allows the secure element to communicate with the biometric sensor into the biometric smart card.

Preferably, the user may be informed of the successful completion of the deactivation operation by a message displayed via the user interface of the hardware machine 82.

Figure 5:
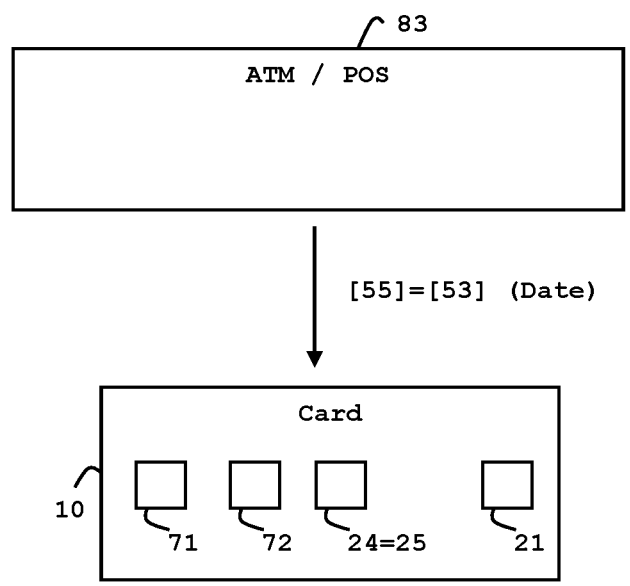

FIG. 5 shows a fourth exemplary embodiment of the smart card coupled to a hardware machine according to an example of invention.

In the example of FIG. 5, a biometric smart card 10 is inserted in a hardware machine 83 like an ATM or a POS terminal. The biometric smart card 10 comprises a secure element, a biometric sensor, a reference biometric data 21 and a control data 25. The control data 25 is the expiration date 24 (i.e. validity date) of the banking application of the smart card 10. The biometric smart card 10 already comprises the erasing command 71 and the disabling command 72. The hardware machine 83 may include a user interface which may comprise a display and a keyboard.

The user (which may be either the genuine user or another one) may insert the smart card 10 into the hardware machine 83 and start a transaction with the hardware machine 83.

The hardware machine 83 may automatically send the current date 53 to the smart card 10.

The biometric smart card may automatically check the received date 53 (which is the specific data) by using the previously stored expiration date 24 (which is the control data 25 in this example).

Only if the received date 53 has been successfully checked (i.e. the validity of banking services of the smart card 10 has expired compared to the received date 53), the biometric smart card 10 may execute both the erasing command 71 for removing the reference biometric data 21 from the biometric smart card and the disabling command 72 for permanently deactivating the communication channel that allows the secure element to communicate with the biometric sensor into the biometric smart card.

In other words, the biometric smart card may receive the specific data from a hardware machine 83 coupled to the biometric smart card, the specific data may be the current date 53 which is used as control data and both the erasing command and disabling command may be pre-stored in the biometric smart card.

According to the example of FIG. 5, the smart card may automatically make the decision to deactivate its own biometric features.

The transaction initially requested is not completed.

It is to be noted that the authentication of the cardholder may be optional for the example of FIG. 5.

Preferably, the user may be informed of the successful completion of the deactivation operation by a message displayed via the user interface of the hardware machine 83.

Figure 6:
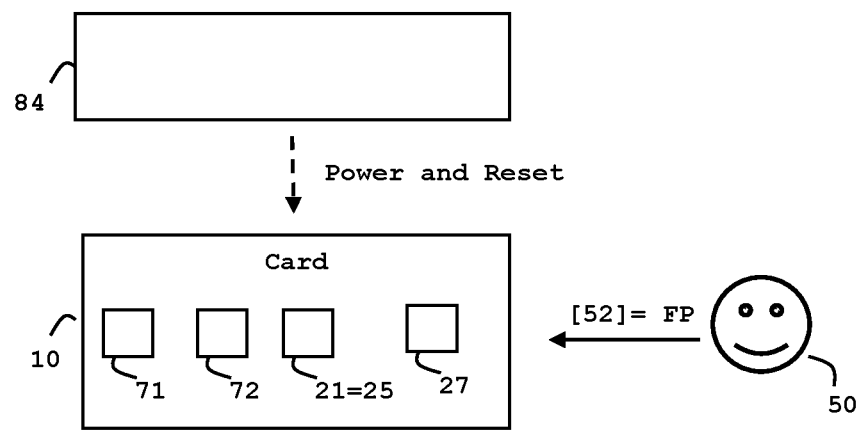

FIG. 6 shows a fifth exemplary embodiment of the smart card coupled to a hardware machine according to an example of invention.

In the example of FIG. 6, a biometric smart card 10 is inserted in a hardware machine 84 like a portable card reader that powers the smart card. Alternatively, the card 10 may be coupled to a NFC mobile phone which may power the smart card thanks to its generated electromagnetic field. The biometric smart card 10 comprises a secure element, a biometric sensor, a reference biometric data 21. In this example, the control data 25 is the reference biometric data 21. The biometric smart card 10 already comprises the erasing command 71 and the disabling command 72. The biometric smart card 10 comprises an agent 27 configured to trigger the deactivation of the biometric features as soon as the user 50 has been successfully authenticated via the biometric sensor.

The hardware machine 84 may be devoid of user interface.

The genuine user 50 may couple the smart card 10 to the hardware machine 84 and present her/his finger to the sensor so that the smart card may get the fingerprint 52 of the user 50.

The biometric smart card may check the captured fingerprint 52 (which is the specific data) or sequence of captured fingerprints by using the previously stored reference biometric data 21 (which is the control data 25 in this example).

Only if the captured biometric data 52 (or sequence of captured fingerprints) has been successfully checked, the biometric smart card 10 may execute both the erasing command 71 for removing the reference biometric data 21 from the biometric smart card and the disabling command 72 for permanently deactivating the communication channel that allows the secure element to communicate with the biometric sensor into the biometric smart card.

In one embodiment, the biometric smart card may be configured to work at least in an enrolment mode and in an erasing mode. The activation of the erasing mode may be triggered by a predefined sequence of actions of the user.

In order to request deactivation of the biometric features of the smart card 10, the user 50 may present a sequence of fingerprints. The sequence of fingerprints may be a series of fingerprints coming from different fingers and/or an order series of enrolled and not-enrolled fingers. For instance a triggering series may be the following sequence (ordered or in any order): thumb, index, middle and little finger. For instance a triggering series may be the following ordered sequence: a fingerprint leading to a successful matching, fingerprint leading to an unsuccessful matching and fingerprint leading to a successful matching.

Advantageously, the biometric smart card may comprise at least one LED which is gradually turned on to guide the user when performing the predefined sequence of actions.

Figure 7:
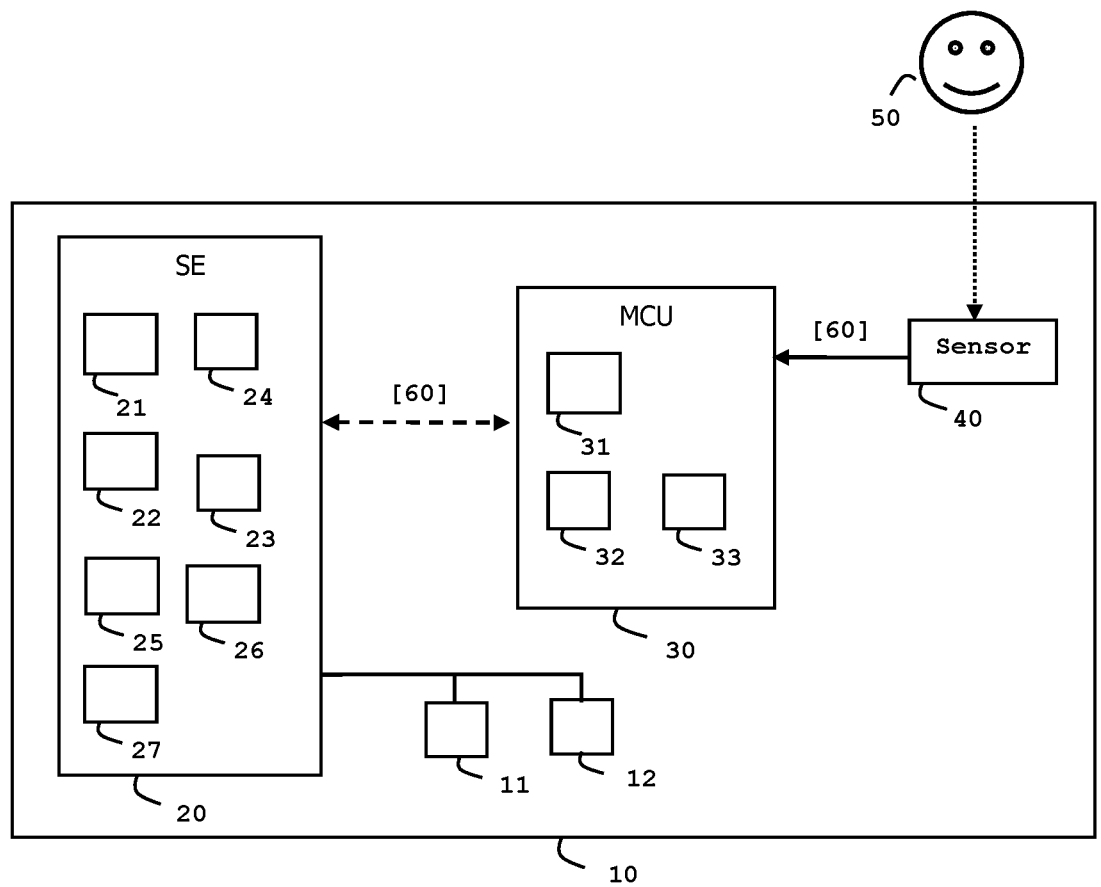
FIG. 7 shows a diagram of a smart card according to an example of the invention.

FIG. 7 shows a diagram of a smart card according to an example of the invention.

In this example, the biometric smart card 10 is a banking smart card.

The smart card 10 comprises a secure chip 20 (also called secure element), a biometric sensor 40 and a controller 30 of the sensor. The controller 30 may be a processing unit (also named processor unit) like a microcontroller unit (MCU). The biometric sensor may be a conventional biometric sensor like a fingerprint sensor.

The controller 30 is coupled to the biometric sensor 40. In particular, the processing unit 30 is the only entity that can directly access the sensor. The controller 30 is configured to retrieve biometric data 60 (also named raw biometric data) from the sensor 40.

The controller 30 comprises a first local key 33 intended to be used to establish a secure communication channel with the secure element 20. The controller 30 may comprise a biometric algorithm 31 aiming at detecting spoofing attacks on the sensor 40.

Optionally, the controller 30 may comprise an analyzer engine 32 for extracting remarkable items from the biometric data collected by the sensor 40.

The controller 30 comprises a processor and a non-volatile memory (not shown). In one embodiment, the non-volatile memory stores software instructions which are executed by the processor to perform the functions described above. In one embodiment, the functions of the controller 30 may be implemented as pure hardware solution or a combination of hardware and firmware.

In the example of FIG. 7, the secure element 20 is a conventional smart card chip with additional features. The secure element 20 is able to contribute to a banking transaction with an external machine. For instance, the transaction may be a payment transaction or cash withdrawal. The secure element 20 comprises a reference biometric data 21 previously enrolled by the user 50. The secure element 20 comprises an extracting engine 22 for extracting remarkable items 52 from the biometric data collected by the sensor 40. The secure element 20 comprises a biometric algorithm 26 aiming at comparing the reference biometric data 21 with remarkable items 52 extracted from the biometric data 60 collected by the sensor 40. The secure element 20 comprises an operating system (not shown).

The secure element 20 comprises the expiration date 24 of the Banking features of the smart card 10. It is to be noted that the card may remain functional for services or commands other than the banking aspect beyond the validity date.

In one embodiment, the secure element 20 may comprise a control data 25 which is different from the reference biometric data 21 and from the expiration date 24.

In one embodiment, the secure element 20 may comprise a second local key 23 intended to be used to establish a secure communication channel with the controller 30. The first and second local keys are paired.

In the example of FIG. 7, the secure element 20 can access the sensor 40 through the controller 30 only. In other words, the secure element can communicate with the biometric sensor through a communication channel that goes through the controller 30. Thus, by permanently removing the (logical or physical) link between the secure element 20 and the controller 30, the communication channel between the secure element and the biometric sensor can be permanently deactivated.

In one embodiment, the secure element 20 may comprise an agent 27 configured to trigger the deactivation of the biometric features as soon as the user 50 has been successfully authenticated via the biometric sensor.

The secure element 20 comprises a processor and a non-volatile memory (not shown). In one embodiment, the non-volatile memory stores software instructions which are executed by the processor to perform the functions of the secure element. In one embodiment, the functions of the secure element 20 may be implemented as pure hardware solution or a combination of firmware and hardware.

In one embodiment, the smart card 10 may comprise one or several LEDs (11, 12) allowing to provide information to the user and physically coupled to the secure element. For example one or several LEDs can be used to guide the user when performing a predefined sequence of actions for triggered activation of the erasing mode in the smart card. For example one or several LEDs may be lit to indicate the end of the operation of deactivation of the biometric feature of the smart card.

In one embodiment, the secure element 20 may comprise pre-stored erasing command 71 and disabling command 72. (Not shown at FIG. 7)

In a one embodiment, the secure element 20 may comply with Specifications from EMV® Contactless Specifications for Payment Systems Version 2.6 or Version 3.0.

In a one embodiment, the secure element 20 may comply with Visa® Integrated Circuit Card Specification (VIS) Version 1.6 or Version 2.2.

In a one embodiment, the secure element 20 may comply with M/Chip Advance Card Application Specification Version 1.2.2 or Version 1.2.3.

The controller 30 and the secure element 20 may communicate through ISO-7816 protocol, through SWP (Single Wire Protocol) or any relevant protocol.

Although the controller 30 and the secure element 20 have been described has separated components in the above-presented examples, they also may be merged in a single hardware component, like a secure microcontroller. For instance, the secure element 20 may include the features of the controller 30. In such an embodiment, the secure element 20 may directly access the sensor 40 through a direct communication channel which may be permanently deactivated by updating a digital value in a specific field (or a register) or by destroying a hardware component needed to handle the communication channel.

Thanks to the invention, it is possible to permanently deactivate the biometric features of a smart card.

The invention allows to enhance the monitoring of risk of fraud for lost and stolen biometric cards.

The invention allows to enhance the management of the end of life of biometric data and features embedded in a smartcard in order to meet cardholder expectations regarding the management of data deemed sensitive.

The invention is not limited to the described embodiments or examples. In particular, the described examples and embodiments may be combined.

The invention is not limited to Banking smart cards and applies to any biometric smart cards allocated to a user.

The biometric smart card may embeds several biometric sensors (of same or different types) and the invention may allow to deactivate access to all embedded biometric sensors.

Although examples of the invention has been provided in the banking domain, the invention also applies to other domains. For example, the online transaction may be an access request to a physical building, room or area.

In another example, the online transaction may be the user's identity authentication by an external machine.

Although examples of the invention has been provided for a fingerprint sensor, it may apply to devices embedding any biometric sensor targeting various types of data: iris, voice, face, blood or palm print for examples.

It is to be noted that the invention applies to any biometric smart cards or similar devices able to be coupled to a hardware machine in contact or contactless mode.

The invention claimed is:

1. A method for managing a biometric smart card associated to a user, said biometric smart card comprising a reference biometric data previously enrolled by said user, a biometric sensor configured to collect a captured biometric data from a person and a secure element able to communicate with the biometric sensor through a communication channel, characterized in that the method comprises the steps:

providing a server computer with information reflecting that said biometric smart card has been lost or stolen, coupling said biometric smart card to a hardware machine and establishing a communication session between the server computer and the hardware machine by starting an online financial transaction, receiving, by the biometric smart card and through both said hardware machine and communication session, a specific data generated by the server computer in accordance with the fact that said biometric smart card has been lost or stolen, wherein the specific data is a cryptographic data, checking, by the biometric smart card, the specific data by using a control data prestored in the biometric smart card, wherein the control data is a key, only if said checking is successful, executing by the biometric smart card both an erasing command for removing said reference biometric data from the biometric smart card and a disabling command for permanently deactivating said communication channel, and rejecting the online financial transaction.

2. The method according to claim 1, wherein the biometric smart card receives a script generated by the server computer, said script comprising said erasing command, said disabling command and said specific data.

3. The method according to claim 1 wherein said erasing command and disabling command are pre-stored in the biometric smart card.

4. The method according to claim 1, wherein the disabling command permanently deactivates said communication channel by updating a digital value or by physically destroying a hardware component into the biometric smart card.

5. A system comprising:

a hardware server computer and a biometric smart card allocated to a user, said biometric smart comprising a reference biometric data previously enrolled by said user, a biometric sensor configured to collect a captured biometric data from a person, and a secure element able to:

communicate with the biometric sensor through a communication channel, characterized in that said hardware server computer is adapted to be provided with information reflecting that said biometric smart card has been lost or stolen, generate a specific data in accordance with the fact that said biometric smart card has been, lost or stolen, wherein the specific data is a cryptographic data, and send accordingly the specific data to the biometric smart card when both said biometric smart card has been coupled to a hardware machine and said communication session has been established between the hardware server computer and the hardware machine by starting an online financial transaction and in that said biometric smart card comprises at least a processing unit and instructions which cause said biometric smart card to:

receive the specific data, check the specific data by using a control data pre-stored in the biometric smart card, wherein the control data is a key, only if said checking is successful, execute both an erasing command for removing said reference biometric data from the biometric smart card and a disabling command for permanently deactivating said communication channel, and reject the online financial transaction.

6. The system according to claim 5, wherein the biometric smart card is configured to receive said erasing command, said disabling command and said specific data from the hardware machine.

7. The system according to claim 5, wherein the disabling command permanently deactivates said communication channel by updating a digital value or by physically destroying a hardware component into the biometric smart card.

* * * * *